Dec. 19, 1933.     R. T. HASLAM     1,940,050
PROCESS FOR OBTAINING REFINED HYDROCARBONS FROM HEAVY UNREFINED HYDROCARBONS
Filed Jan. 8, 1930
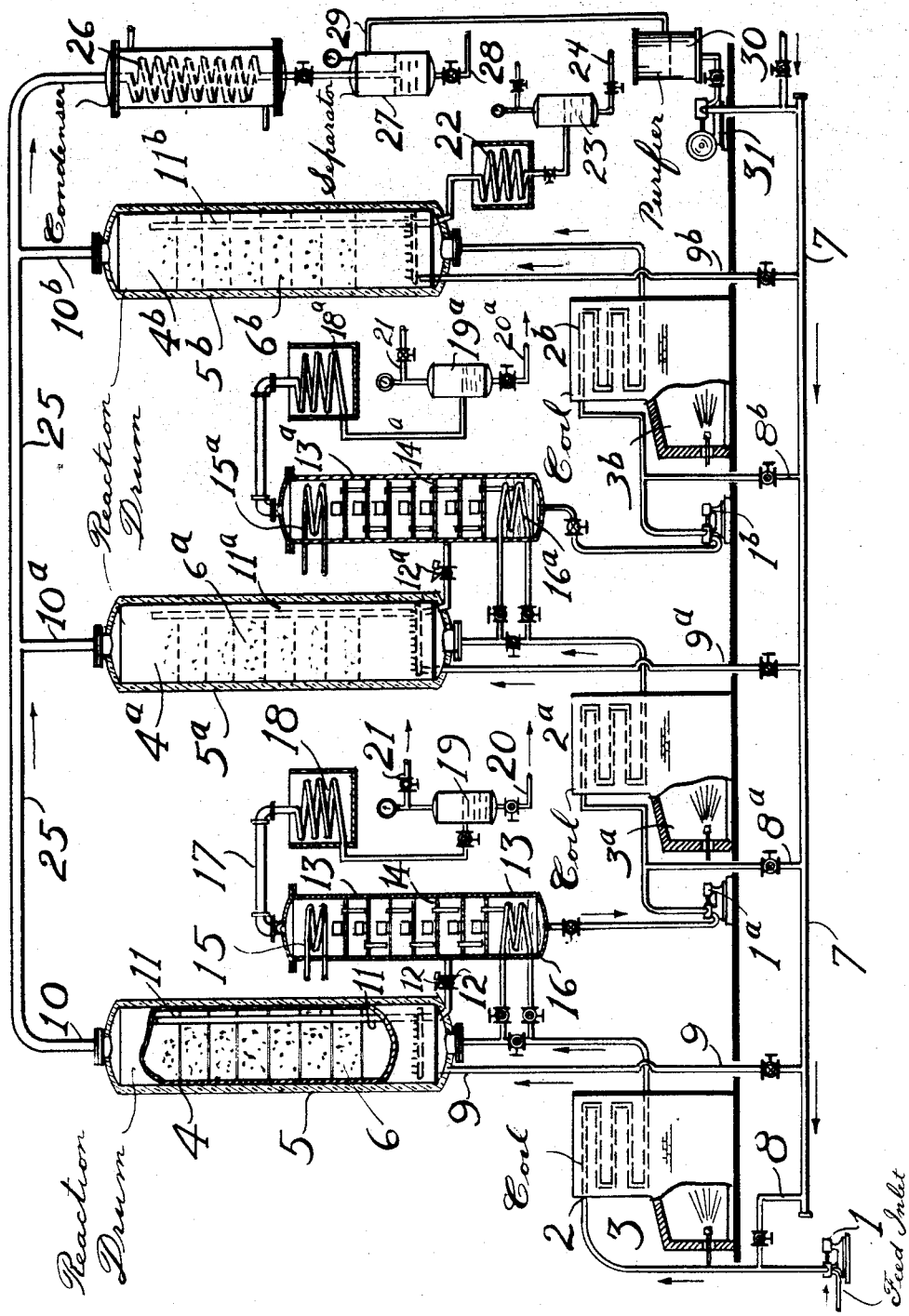
INVENTOR
Robert T. Haslam
BY
ATTORNEY Patented Dec. 19, 1933

1,940,050

UNITED STATES PATENT OFFICE 1,940,050

PROCESS FOR OBTAINING REFINED HYDROCARBONS FROM HEAVY UNREFINED HYDROCARBONS

Robert T. Haslam, Westfield, N. J., assignor to Standard-I. G. Company

Application January 8, 1930. Serial No. 419,293

3 Claims. (Cl. 196—78)

The present invention relates to the refining of hydrocarbon oils with hydrogen under high pressure and at high temperature and more specifically comprises an improved process for the manufacture of high grade lubricating oils from crude, reduced crude or suitable heavy fractions thereof. My invention will be fully understood from the description and the drawing which illustrates a suitable form of apparatus.

The drawing is a semi-diagrammatic view in sectional elevation of an apparatus suitable for carrying out my improved hydrogenation treatment and indicates the flow of materials.

Referring to the drawing, numeral 1 denotes a feed pump which forces a suitable oil from storage (not shown) through a suitable heating means 2, which may comprise a coil arranged in a setting 3. Coil 2 discharges into a high pressure reaction vessel 4, which is adapted to withstand high temperature and the corrosive effect of hydrogen and oil. The drum is covered by suitable insulation 5 and is preferably packed with catalytic material 6 in lump form, the nature of which will be disclosed below. Hydrogen or gas rich in free hydrogen is forced under high pressure into drum 4 from a high pressure manifold 7 and it may be intoduced, either through the coil 2 by line 8 or directly to the drum by line 9, or by both of these means. Gas and light oil are vaporized and removed from the drum by line 10 and liquid is drawn off by line 11, which is fitted with a pressure reduction valve 12, to a separation means 13. The separation means may be an open drum which allows the escape of the lighter products from the oil, due to the release of pressure but it is preferable to use a tower which may be fitted with baffling means 14, a reflux coil 15 at the top and a heating means 16 at the base. Part of the oil from coil 2 may be circulated through the heating means 16 on its way to drum 4. The vaporized material escapes by line 17 to condenser 18 and gas separator 19 from which light oil is drawn by line 20 and gas by line 21.

The oil remaining liquid in tower 13 is then forced by pump 1$^a$ to a unit similar to the one described above, comprising heating coil, reaction drum and separators which are given the number corresponding to those of the first unit with a subscript "a". Any number of such units may be used and the drawing shows a third unit with number corresponding to those of the first with subscript "b". The last unit, in this case the third, is fitted with a cooler 22 in place of tower 13 and gas separator 23 from which the liquid is removed by line 24 to storage (not shown).

Vapor from each of the reaction vessels, 4, 4$^a$ and 4$^b$ is collected in a vapor manifold 25 which communicates with a condenser 26 and separator 27. Light oil is removed from the separator to storage (not shown) by line 28 and the gas which comprises hydrogen is conducted by line 29 to a purifier 30. The purifier may be a scrubbing tower, in which the gas is scrubbed with oil under high pressure to remove hydrogen sulphide and hydrocarbon constituents, but other suitable means for the purpose may be used. Purified gas flows to recompressor 31 and is returned to a manifold 7. The gas from each of the gas separators 19, 19$^a$ and 23 may be recompressed by means (not shown) and mixed with the gas going to the purifier, if desired.

In the operation of my improved process, I have observed that in order to produce high grade lubricating oils, particularly from Mid Continent and crudes of the same general type, it is necessary to use temperatures in excess of 750° F. and that under such conditions there is a certain amount of decomposition to form lighter products such as naphtha boiling below 400° F. and gas. The longer the oil is exposed to temperature above 750°, the better is the heavy oil but, at the same time, the loss is greater. In the present method it is desirable to treat the heaviest products for the longest time and to remove the lighter fractions, when they have received sufficient treatment. To this end, the drums are maintained at temperatures from about 750° to 870° F. under pressure in excess of 50 atmospheres but preferably in excess of 100 or even 200 atmospheres. A liquid level is maintained in each drum, 4, 4$^a$ and 4$^b$ and the lightest fractions such as naphtha and boiling largely below 400° F. are removed as vapor from the drums. This oil is preferably substantially free of the lubricating fractions.

The oil removed as a liquid is then flashed through a reduction valve 12 into a tower 13. It is desirable to maintain a super-atmospheric pressure in tower 13, for example, 30 atmospheres more or less, when the reaction drums operate at 200 atmospheres. Pressure may be adjusted to remove only the light oils or to remove lubricating fractions as well which have received sufficient treatment. The oils from drums, 19, 19$^a$ and 19$^b$ are preferably recombined and fractioned, as desired. The volume of hydrogen recirculated is in great excess of that actually combining with the oil and is preferably upward of 5,000 cubic feet per barrel of oil fed.

By means of the present method it is possible to produce high grade lubricating oils with better yields than have been heretofore obtained. The finished products are usually washed with alkali and may be acid treated, depending on the character of product desired.

The catalysts used in my process are preferably oxides of the metals of the second and sixth groups of the periodic system of elements either alone or in mixtures with each other or other oxides such as alumina or the rare earth oxides.

The present invention is not limited to any particular type of oil nor to any theory of the mechanism of the process, nor to any method which may be disclosed as illustrative of my invention, but only by the following claims in which I wish to claim all novelty inherent in the process.

I claim:

1. In a process for improving the quality of lubricating oils derived from petroleum by subjecting such oils to the action of hydrogen at temperatures between 750 and 870° F. and under pressures in excess of 50 atmospheres for a limited time whereby an appreciable but restricted quantity of low boiling hydrocarbons is formed, the improvement which comprises carrying out the treatment with hydrogen in a series of reactors, continuously removing vapors formed in each reactor, withdrawing liquid from each reactor when only a portion thereof has been improved to a predetermined extent, removing from the liquid so withdrawn the portion sufficiently improved, and passing the remaining liquid to a succeeding reactor for further treatment.

2. Process according to claim 1 in which that portion of the liquid product which has been sufficiently treated is removed by substantially reducing pressure on the liquide withdrawn whereby the lighter fractions are caused to vaporize.

3. Process according to claim 1 is which the material is maintained in each reactor under a pressure of about 200 atmospheres and pressure is reduced on the liquid product withdrawn to about 30 atmospheres.

ROBERT T. HASLAM.